Sept. 14, 1954  D. R. DE BOISBLANC ET AL  2,688,875
AIRPLANE FUEL GAUGE
Filed April 16, 1951

INVENTORS
D. R. DE BOISBLANC
E. A. MALICK
BY Hudson & Young
ATTORNEYS

Patented Sept. 14, 1954

2,688,875

UNITED STATES PATENT OFFICE 2,688,875

AIRPLANE FUEL GAUGE

Deslonde R. De Boisblanc and Emil A. Malick, Bartlesville, Okla., assignors to Phillips Petroleum Company, a corporation of Delaware Application April 16, 1951, Serial No. 221,250

8 Claims. (Cl. 73—304)

1

This invention relates to apparatus for determining the amount of fuel in an airplane fuel tank. In another aspect it relates to improved means for compensating a capacitance-type fuel gage for variations in fuel density or dielectric constant.

In aircraft operation it is extremely important to be able to determine the weight of fuel remaining in the tank at any given time. Since the number of B. t. u.'s or power contained in a given quantity of fuel is determined by the weight of the fuel rather than the particular volume occupied by said fuel, it is important to have a gage that will give an indication in terms of the weight rather than the volume of the fuel. In the early type gages employed in aircraft a cork or hollow metal float was used to measure the level of the fuel, this information being transmitted by way of mechanical linkage and/or electrical circuits to an instrument on the pilot's or flight engineer's instrument panel. However, serious errors resulted from gasoline slosh within the tank, volumetric expansion of the gasoline at different temperatures, and wear in the mechanical linkage connecting the indicating device to the instrument panel.

In order to compensate for these measuring difficulties and to provide an indication in terms of the weight of the fuel rather than the volume, capacitance-type fuel gages have been utilized in recent years. These generally take the form of parallel capacitor plates immersed in the fuel tank. By measuring the dielectric constant of gasoline, which varies from approximately 1.85 to 2.3 depending upon the temperature and the constituents of the gasoline, a determination of the fuel level between capacitor plates in a tank may readily be obtained by measuring the resulting capacitance. Although instruments of this type are considerably more accurate than the former float type gage, they are still somewhat limited by the fact that the dielectric constant or density of the fuel loaded into the aircraft from flight to flight may vary by an appreciable factor. These variations introduce errors in the indicating weight or volume, depending upon the type of gage used. Since it is extremely important, particularly in military operations, for the pilot or flight engineer to be able to determine the exact amount of available fuel remaining in the plane at any given time, any improved means for compensating for different densities or dielectric constants of the fuel being used will obviously result in a valuable contribution to the field of aircraft operation, particularly military operations.

2

The first and most obvious method of compensating for the above mentioned errors is to calibrate the gage in terms of an average fuel. Such a method, of course, implies that any errors due to extreme variations in density or dielectric constant are of a sufficiently small magnitude as to be capable of being tolerated, which may or may not be true in all cases.

A second, and more accurate method of compensating such gages, toward which the present invention is directed, is to provide an initial adjustment in a capacitive-type gage whereby compensation for variations in density and dielectric constant in the various fuels being used is made when the plane is fueled.

It is therefore an object of this invention to provide improved apparatus for determining the weight of fuel in an aircraft fuel tank.

It is a further object to provide improved means for calibrating existing fuel gages for variaions in density of the fuel being measured.

It is a further object to provide apparatus for measuring directly the weight of fuel in various shaped fuel tanks.

It is a still further object to provide an aircraft fuel gage which is simple in construction, reliable in operation, rugged and durable.

Various other objects, advantages and features of this invention will become apparent from the following detailed description taken in conjunction with the accompanying drawings illustrating a preferred embodiment of the invention in which.

Figure 1:
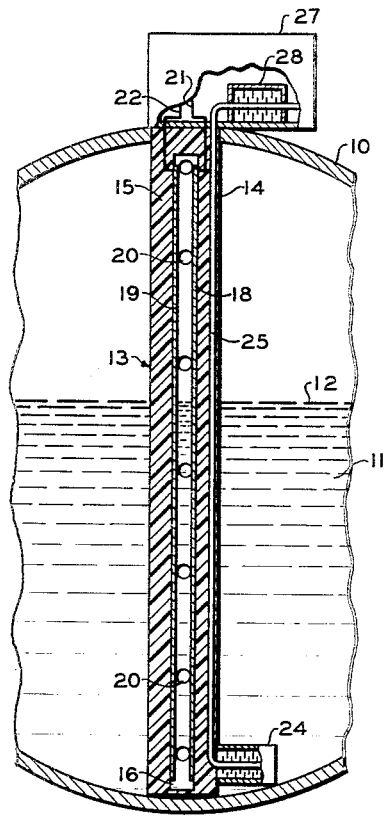
Figure 1 is a vertical section view of a suitable capacitance-type fuel gage for use in this invention.

Referring now to the drawings in detail and particularly to Figure 1, there is shown diagrammatically a portion 10 of a cylindrical airplane fuel tank which is filled with a fuel 11 to a level 12. An elongated casing or frame 13 is disposed in tank 10 having its lower end immersed in liquid 11. The casing includes a pair of flat spaced plates 14 and 15 joined by transverse frame members, one of which is shown at 16. The spaced plates 14 and 15 carry elongated relatively narrow metal strips 18 and 19, respectively, and these strips are mounted in facing, closely spaced parallel arrangement. Frame member 16 is provided with openings 20 to admit fuel 11 to the interior of the casing. Accordingly, the fuel level within the casing is always the same as the fuel level outside the casing. It will be apparent that the strips 18 and 19 form a pair of spaced condenser elements, the portion of the strips below level 12 having fuel 11 as a dielectric material and the portion of the strips above level 12 having air or a mixture of air and fuel vapor as a dielectric material. Since the dielectric constant of any such mixture of air and fuel vapor closely approaches unity, no appreciable error is introduced in assuming that the region between strips 18 and 19 above the fuel level 12 is filled with air, which has a dielectric constant of unity. The upper ends of metal strips 18 and 19 are connected by conductors 21 and 22, respectively, into the balancing circuit of Figure 3. A variable condenser 24 is mounted at the lower end of frame member 14, the stator and rotor plates of said condenser being completely immersed in the fuel 11 so that this fuel constitutes the entire dielectric material of condenser 24. The shaft of variable condenser 24 is connected by means of a flexible coupling 25 to the shaft of a second condenser 28 which is located outside fuel tank 10 and enclosed within a suitable housing 27, which also encloses the electric circuit shown in Figure 3. Since condenser 28 is located outside of fuel tank 10 it has air for its dielectric material. Both condensers 24 and 28 are connected into the electrical circuit of Figure 3 by suitable leads, not shown, in Figure 1.

Figure 3:
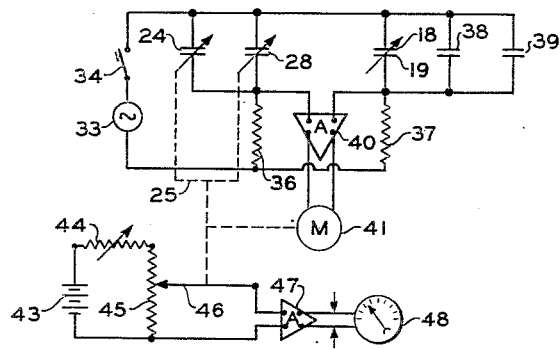
Figure 3 is a schematic circuit diagram of the balancing and compensating circuit for determining the weight of fuel being measured.

The circuit of Figure 3 includes both a balancing bridge circuit and a calibration circuit which may be adjusted to the density of the particular fuel being measured. The bridge components include an alternating current source 33, a switch 34, a motor 41 driven by the output of amplifier 40, and balancing resistors 36 and 37. The variable condensers 24 and 28 are connected in parallel in one arm of the bridge circuit and the capacitance between capacitor plates 18 and 19 of Figure 1 is represented by a variable condenser connected in the second arm of the bridge circuit.

Figure 2:
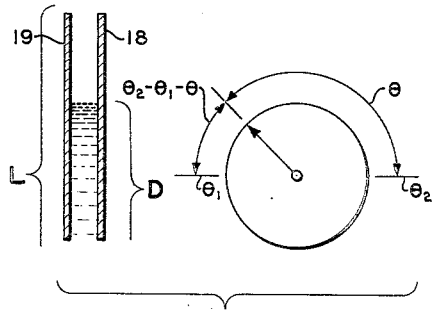
Figure 2 is a view illustrating a manner of measuring the liquid level.

When the fuel level is below the lower end of metal plates 18 and 19, that is, tank 10 being essentially empty, the capacitance between these plates may be represented by the quantity $(l \times L \times A)$, where $l$ is the dielectric constant of the air or other gas between the plates, L is the length of the plates, and A is a factor representing the cross sectional area and spacing of the plates. When plates 18 and 19 are completely immersed in the fuel 11, the capacitance between said plates may be represented by the quantity $(K \times L \times A)$, where K is the dielectric constant of fuel 11. As the fuel level varies, the capacitance between elements 18 and 19 varies in a linear manner between the two extreme values $(L \times A)$ and $(K \times L \times A)$. Therefore, with reference to Figure 2 where fuel 11 is represented as being at a depth D relative to the lower end of strips 18 and 19, the capacitance between plates 18 and 19 is $$C = A[KD + (L-D)l] \quad (1)$$

Variable condensers 24 and 28 are so coupled by shaft 25 that the rotation of shaft 25 produces an increase in capacitance of one condenser and a decrease in capacitance of the other condenser. In accordance with this invention the capacitances of condensers 24 and 28 are so adjusted that their total capacitance when connected in parallel varies, upon rotation of shaft 25, in the same manner as the capacitance between elements 18 and 19 varies due to the changing level of fuel 11. Thus, at an angular position $\theta_1$ condenser 24 has a maximum capacitance equal to $(K \times L \times A)$ and condenser 28 has a minimum capacitance which is negligible. At a second angular position $\theta_2$, condenser 28 has a maximum capacitance equal to $(L \times A)$ while condenser 24 has a minimum capacitance which is negligible. Thus, these two settings of the condensers provide capacitances which correspond to the capacitances between elements 18 and 19 when the region therebetween is filled with fuel 11 and empty, respectively. As the setting of condensers 24 and 28 is varied the total capacitance varies in a linear manner, similar to the linear variation produced by a change in the liquid level between capacitor plates 18 and 19. At an angular shaft position $\theta°$ from position $\theta_2$ the capacitance of the dual parallel condenser unit may be expressed as follows:

$$C = A[K\theta + (\theta_2 - \theta_1 - \theta)] \quad (2)$$

It will be noted that the angle $(\theta_2 - \theta_1)$ of Expression 2 corresponds to the length L of plates 18 and 19 in Expression 1; and $\theta$, the angle of shaft rotation, corresponds to term D in Expression 1, that is, when the capacitance of unit 18, 19 is equal to the capacitance of units 24 and 28, $\theta$, the angle of shaft rotation, is directly proportional to the liquid level in the tank. Accordingly, with the circuit components connected in bridge arrangement as shown in Figure 3, when condensers 24 and 28 are adjusted through rotation of shaft 25 by motor 41 so as to produce balance of the bridge, the capacitance of condensers 24 and 28 becomes equal to the capacitance of unit 18, 19 with the result that the rotation of shaft 25 gives a direct indication of the depth of liquid in the tank 10. This rotation of shaft 25 to produce a balanced condition of the bridge circuit is accomplished by means of amplifier 40 which drives motor 41, the latter which may preferably be a small two-phase synchronous motor. Whenever the bridge circuit is unbalanced, there exists a voltage difference across the input terminals of amplifier 40, which after amplification drives motor 41, which in turn drives shaft 25. The rotation of shaft 25 varies the total capacitance of condensers 24 and 28 until a balance condition is obtained in the bridge circuit. At this point the voltage difference applied across the input of amplifier 40 is zero, resulting in a balanced condition of the circuit.

An important feature of this gage so far described is that the accuracy of the level indicator is not affected in any manner by the dielectric constant of the liquid in the tank. Thus, it can readily be seen that the angle $\theta$ is equal to the depth D in the aforementioned relationships regardless of the value of K, the dielectric constant, since condenser 24 completely compensates for variations in the dielectric constant of the various fuels being measured. Since it is known that the dielectric constant of gasoline varies over an appreciable range, the condenser type gage so far described gives an accurate reading of the fuel level in the tank.

The accuracy of the aforementioned gage may be somewhat increased if desired by connecting two condensers 38 and 39 in parallel with the condenser unit 18, 19. Condenser 38 is immersed in the fuel whose level is being measured and its capacitance is equal to the residual capacitance of condenser 24, that is, the capacitance between the plates of condenser 24 when said condenser is at its position of minimum capacitance. Condenser 39 has an air dielectric, its capacitance being equal to the residual capacitance of condensers 28. The use of these balancing condensers eliminates that small error which is introduced in the previous example by assuming that the residual capacitance of condensers 24 and 28 is negligible.

It can thus be seen that the capacitance-type fuel gage so far described, which is of essentially the same form as that disclosed in the copending application of L. M. Oberlin and D. R. De Boisblanc, Serial No. 98,348, filed June 10, 1949, now Patent No. 2,622,442, will compensate for one of the variables, dielectric constant, inherent in different mixtures of airplane fuel. However, there still remain variations in density of different fuels which must be compensated for in order to obtain completely accurate results. It is to compensate for differences in density of the various fuels employed that the calibrating arrangement coupled to the balancing circuit of Figure 3 has been employed.

Figure 4:
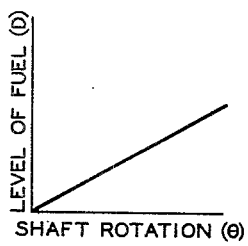
Figures 4, 5, and 6 show calibration curves of the gage of Figures 1 and 3.

In Figure 4 there is shown the relationship of the level D (level 12 of fuel 11) as a function of the angle of rotation $\theta$ of shaft 25. In order to make the shaft rotation $\theta$ give an indication of the weight of fuel in tank 10, rather than a volume measurement as indicated, means must be provided for calibrating the indicating gage for fuels of different density. A circuit for providing such a calibration in accordance with this invention comprises voltage source 43, variable resistor 44 and potentiometer 45, all connected in series relationship. It is desirable that resistor 44 have an ohmic value considerably higher than that of potentiometer 45 in order that the current flow through potentiometer 45 remain fairly constant for various settings of the contactor 46. The contactor 46 of potentiometer 45 is also mechanically coupled to shaft 25 so that the voltage drop taken across potentiometer 45 at any given position of contactor 46 gives an indication of the position of shaft 25, that is, the shaft rotation $\theta$. The voltage drop picked off potentiometer 45 is amplified by amplifier 47 and applied to an indicating device 48 which may be the fuel gage on the instrument panel of an airplane. By varying the setting of resistor 44, which determines the current flow through potentiometer 45, the relative magnitude of the voltage drop, picked off potentiometer 45, representing shaft rotation $\theta$ may be varied as desired. By calibrating resistor 44 in terms of the density of the fuel being used in the airplane the basic setting of gage 48 is thereby compensated for changes in density of the fuel being measured.

In actual operation, the basic calibration of the fuel gage is determined by the initial setting of resistor 44 which is properly positioned, each time the plane is fueled, according to the known or readily determined density of the particular fuel being used. It can therefore be seen that this capacitive-type gage compensates for both changes in dielectric constant and changes in density of the particular fuel which is a solution to the problem hereinbefore stated.

Figure 5:
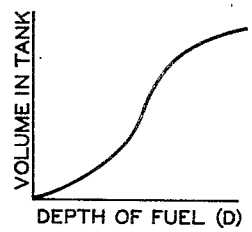
Figure 6:
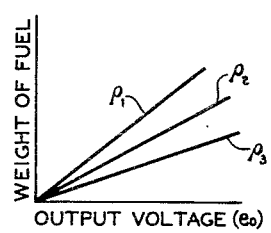

In Figure 5 here is shown the relationship of the volume of fuel remaining in tank 10 at any given depth D (level 12) of fuel 11. Assuming that tank 10 is cylindrically shaped, as shown, the relationship of the volume of fuel in the tank for any particular level 12 is substantially as shown. Since it is desirable that fuel gage 48 give a linear reading with respect to the fuel remaining in the tank, potentiometer 45 is made non-linear, its particular form being determined by the geometric shape of fuel tank under measurement. By the use of an appropriate non-linear potentiometer 45, the output voltage $e_0$ of amplifier 47 gives a linear reading of the volume of fuel within the tank, and by initially setting resistor 44 to represent the density of the fuel being measured, curves such as those illustrated in Figure 6 may be obtained where voltage $e_0$, that is, the reading of fuel gage 48 varies linearly with the weight of fuel remaining in the tank. The three curves illustrated show the weight of fuel remaining in tank 10 for various fuels 11 having densities $\rho_1$, $\rho_2$, $\rho_3$ respectively. Any given shaft rotation $\theta$ represents the level (or volume) of fuel remaining in tank 10 while the compensation of resistor 44 for density converts any given shaft rotation into a corresponding output voltage $e_0$ which represents weight of fuel, the desired information. Thus by initially setting resistor 44 to a value in accordance with the density of fuel being loaded into an airplane fuel tank there is provided in accordance with this invention apparatus for automatically indicating the exact weight of fuel remaining in said tank at each given instant during flight.

While this invention has been described in connection with a preferred embodiment thereof, it should be apparent to those skilled in the art that various modifications could be made in connection with the actual structure shown without departing from the scope of this invention.

We claim:

1. In a capacitance-type fuel gage adapted to provide an electrical signal representing the depth of fuel in a tank, means for calibrating said gage for fuels of different densities comprising first and second resistors and a voltage source connected in series circuit relationship, means for adjusting said first resistor in accordance with the density of the fuel being measured, means under control of said electrical signal to pick off a portion of the voltage drop across said second resistor corresponding to the fuel level in the tank being measured, and means to measure said picked off voltage representing the weight of fuel being measured.

2. In a capacitance-type airplane fuel gage having a pair of spaced capacitor plates inserted in a fuel tank, said fuel forming the dielectric material between said plates, a pair of ganged balancing condensers, and an alternating current bridge circuit for balancing the capacitance of the spaced capacitor plates against said balancing condensers; improved means for compensating said gage for fuels of different densities comprising, in combination, first and second resistors and a voltage source connected in series relationship, means for adjusting said first resistor corresponding to the density of the fuel being measured, and means for picking off a portion of the total voltage drop across said second resistor corresponding to the balanced condition of said bridge circuit, said picked off portion of the total voltage drop representing the quantity of fuel in said tank.

3. In a capacitance-type airplane fuel gage having a pair of spaced capacitor plates inserted in a fuel tank, said fuel forming the dielectric material between said plates, a pair of ganged balancing condensers, and an alternating current bridge circuit for balancing the capacitance of the spaced capacitor plates against said balancing condensers; improved means for compensating said gage for fuels of different densities comprising, in combination, a voltage source applied across a potentiometer calibrated in accordance with the geometric design of said fuel tank, means for varying the voltage applied across said potentiometer in accordance with the density of the fuel being measured, means for varying the contactor of said potentiometer according to the fuel level in the tank being measured as determined by balanced condition of said bridge circuit, and means for determining the voltage drop between the contactor and one end terminal of said potentiometer, said voltage drop representing the weight of fuel in said tank.

4. In a capacitive-type airplane fuel gage including a pair of spaced capacitor plates inserted in a fuel tank, said fuel forming the dielectric material between said plates, a pair of ganged balancing capacitors, one of said balancing capacitors being inserted in said fuel and the other balancing capacitor being positioned outside said fuel, and an alternating current bridge circuit including motor driven means for balancing the capacitance of the spaced capacitor plates against said balancing capacitors; means for calibrating said gage for fuels of different densities comprising, in combination, a potentiometer, a voltage source applied across said potentiometer, said source being adjustable in accordance with the density of the fuel to be measured, means coupled to the motor driven means of said bridge circuit for varying the contactor of said potentiometer according to the fuel level in the tank being measured as determined by balanced condition of said bridge circuit, and means for determining the voltage drop between the contactor and one end terminal of said potentiometer, said voltage drop representing the weight of fuel in said tank.

5. In a capacitive-type airplane fuel gage including a pair of spaced capacitor plates inserted in a fuel tank, said fuel forming the dielectric material between said plates, a pair of ganged balancing capacitors, one of said balancing capacitors being inserted in said fuel and the other balancing capacitor being positioned outside said fuel, an alternating current bridge circuit including motor driven means for balancing the capacitance of the spaced capacitor plates against said balancing capacitors; means for calibrating said gage for fuels of different densities comprising, in combination, a potentiometer calibrated in accordance with the geometric design of said fuel tank, a voltage source applied across said potentiometer, said source being adjustable in accordance with the density of the fuel to be measured, means coupled to the motor driven means of said bridge circuit for varying the contactor of said potentiometer according to the fuel level in the tank being measured as determined by balanced condition of said bridge circuit, and means for amplifying and detecting the voltage drop between the contactor and one end terminal of said potentiometer, said voltage drop representing the weight of fuel in said tank.

6. A fuel gage adapted to provide a measurement of the weight of fuel in a tank comprising, in combination, a capacitance-type fuel gage adapted to provide a signal representing the fuel level in the tank, a potentiometer, a voltage source applied across the end terminals of said potentiometer, means for adjusting said voltage source in accordance with the density of the fuel being measured, means under control of said signal for adjusting the contactor of said potentiometer whereby the position of the contactor of said potentiometer with respect to one end terminal thereof is representative of the fuel level in the tank being measured, and means to measure the voltage between the contactor and said one end terminal of said potentiometer representing the weight of fuel being measured.

7. A fuel gage adapted to provide a measurement of the weight of fuel in a tank comprising, in combination, a capacitance-type fuel gage adapted to provide a signal representing the fuel level in the tank, a non-linear potentiometer calibrated in terms of the volume of the fuel tank being measured as a function of the depth of fuel therein, a voltage sourcve applied across the end terminals of said potentiometer, means for adjusting said voltage source in accordance with the density of the fuel being measured, means under control of said signal for adjusting the contactor of said potentiometer whereby the position of the contactor of said potentiometer with respect to one end terminal thereof is representative of the fuel level in the tank being measured, and means to measure the voltage between the contactor and said one end terminal of said potentiometer representing the weight of fuel being measured.

8. A fuel gage adapted to provide a measurement of the weight of fuel in a tank comprising, in combination, a capacitance-type fuel gage adapted to provide a signal representing the fuel level in the tank; a variable resistor; a non-linear potentiometer calibrated in terms of the volume of the fuel tank being measured as a function of the depth of fuel therein; a voltage source; said variable resistor, said potentiometer and said voltage source being connected in series circuit relationship; means for adjusting said variable resistor in accordance with the density of the fuel being measured; means controlled by said signal to adjust the contactor of said potentiometer; and means to measure the voltage drop between the contactor and one end terminal of said potentiometer representing the weight of fuel in said tank being measured.

References Cited in the file of this patent

UNITED STATES PATENTS

| Number | Name | Date |
|---|---|---|
| 880,273 | Bristol | Feb. 25, 1908 |
| 1,231,964 | Suchanek | July 3, 1917 |
| 1,588,544 | Frisch | June 15, 1926 |
| 2,354,964 | Ostermann et al. | Aug. 1, 1944 |
| 2,409,073 | Sias et al. | Oct. 8, 1946 |
| 2,465,191 | Borden et al. | Mar. 22, 1949 |
| 2,554,715 | Mellett | May 29, 1951 |
| 2,570,218 | Draganjac | Oct. 9, 1951 |